3,556,826
NITROCELLULOSE COATED PLASTIC FILM

Le Roy F. Gronholz and Paul H. Settlage, Richmond, Va., and Jerome L. Schwartz, Newark, Del., assignors to E. I. du Pont de Nemours and Company, Wilmington, Del., a corporation of Delaware
No Drawing. Filed Feb. 17, 1967, Ser. No. 616,802
Int. Cl. C08b 21/12, 21/14, 27/22
U.S. Cl. 106—170                                    7 Claims

ABSTRACT OF THE DISCLOSURE

An aqueous nitrocellulose composition useful as a coating for films such as polypropylene where properties such as odor sensitivity, film blocking, solvent seal, gloss, etc. are important. The composition contains nitrocellulose, plasticizer (dibutyl phthalate), coalescing agent (methyl "Cellosolve"), emulsifier ("Gafac" RE610), hard resin modifier (sucrose benzoate), wax (carnauba), and a particulate slip agent ("Geon 126").

BACKGROUND OF THE INVENTION

This invention relates to water-borne nitrocellulose coating compositions particularly useful in combination with films used in wrapping odor sensitive products.

Nitrocellulose coating compositions are known as illustrated by such United States patents as 2,998,324 and 3,111,418 and British patent specification 985,291. However, these compositions generally contain large proportions of organic solvents which render their use in many applications undesirable. Among some of the undesirable characteristics are the high flammability associated with the solvent and the difficulty in completety removing the solvent where no residual solvent odor can be tolerated. Thus, the use of available nitrocellulose coatings on films for high speed machine wrapping of odor sensitive products, such as tobacco, is presently not feasible.

In a copending application, Ser. No. 427,163, filed January 1965, by W. B. Webb, now abandoned, and in Belgian Pat. 660,374 the preparation of a broad range of cellulose containing coating compositions as aqueous dispersions are described. While films coated with these compositions are satisfactory from the viewpoint that no organic solvent is necessary, it has been discovered that they do not fully satisfy all the requirements demanded of a coated film used in the rapid machine packaging of sensitive products such as tobacco.

Such requirements include good barrier resistance against permeation by undesirable vapors and good transparency without wrinkling. Additionally, the coated film must have a low coefficient of friction and a high hot-drag temperature to enable its use with automatic wrapping machines, and possess non-blocking characteristics that permit wrapped packages to be stored for periods of time without sticking together. A further necessary feature of the film is that it be solvent sealable at a low temperature in order to obviate the necessity for high temperature heat sealing which can damage the packaged article. Moreover, the coated film must be substantially devoid of heat sealability in order to avoid blocking tendencies on package storage.

SUMMARY OF THE INVENTION

According to the present invention there is provided a water-borne nitrocellulose coating composition that effectively satisfies all the requirements demanded of a coating for a film used in the high speed machine packaging of odor sensitive products. In particular, when this coating is used on a dimensionally stable plastic film, in lieu of the ordinary regenerated cellulose film, an especially durable and strong wrap is provided. The non-aqueous ingredients of the composition of the present invention include the following enumerated constituents, all percentages being by weight and their sum being 100:

(a) 30–60%, preferably 40–50%, nitrocellulose having a nitrogen content of 10.8–12.2%, preferably 11.8–12.2%, and a viscosity of ⅛–6 seconds, preferably ¼–½ seconds;
(b) 0–10%, preferably 0–5%, solid plasticizer;
(c) 5–35%, preferably 10–18%, liquid plasticizer;
(d) 10–30%, preferably 10–18%, coalescing agent having a boiling point of 120° C.–250° C., preferably 130° C.–230° C., and a relative evaporation rate of about 0.01–0.5, preferably 0.01–0.13;
(e) 0.1–20%, preferably 1.5–10%, emulsifier;
(f) 20–50%, preferably 25–40%, film forming hard resin modifier.

Additionally, the composition contains (g) 2–7.5%, preferably 3–6%, of a naturally occurring wax having a melting point above 75° C. and (h) 0.1–1.0% of a particulate slip agent having a particle size between 0.1 and 10 microns, the weight percentage of (g) and (h) being based on 100 weight percent of ingredients (a)–(f). In the above described composition, the weight ratio of (b)+(c)+(d) to (a) is 0.33–2.2, and preferably 0.43–1.27, and ingredient (b) is present in an amount that is less than 50% of (b)+(c). Additionally, the nitrocellulose particles have a number average particle diameter of about 0.05–1.0 micron with greater than 90% of these particles having a diameter of less than 0.8 micron, and preferably less than 0.6 micron.

The water-borne composition of this invention, when coated on a biaxially oriented plastic film and dried, provides an improved wrapping material for tobacco and similarly sensitive products which exhibits unexpectedly superior properties. The film is dimensionally stable, odor free, transparent, and resistant to the permeation of undesirable vapors. Additionally, the film is readily solvent sealable, devoid of heat sealability, non-blocking, and easily adaptable to use with conventional automatic high-speed wrapping machines.

DESCRIPTION OF THE INVENTION

As used in this invention the term consisting essentially of means that the named ingredients are essential. However, other ingredients which do not detract substantially from the basic properties of the present composition can also be present.

Methods of preparing the composition of the present invention and the measurement of such properties as particle size, viscosity, and relative evaporation rate are described in the aforementioned Belgian patent and Ser. No. 427,163, the disclosures of which are hereby incorporated for reference. The basic method of preparation comprises forming an oil-in-water emulsion of nitrocellulose, water, emulsifier, plasticizers, hard resin modifier, and coalescing agent in a volatile solvent. The emulsion is passed through a high-shear mixing device which maintains an attrition zone having a peripheral velocity of at least 1,000 feet per minute subsequent to which the volatile solvent is distilled off. The length of time that the emulsion remains in the mixing device determines the eventual nitrocellulose particle size. While it is preferable to add the plasticizers, hard resin modifier, and coalescing agent to the emulsion prior to high speed mixing, they can be added at any time so long as they are uniformly incorporated into the composition. The addition of the naturally occurring wax and particulate slip agent is preferably made after the mixing operation. These ingredients are generally added in the form of an emulsion which is then blended with the originally formed emulsion.

As distinguished from the above mentioned Belgian patent and U.S. application, the viscosity of the nitrocellulose useful in the present invention does not exceed 6 seconds (measured according to ASTM-D-301-56 at 25% conc.) and preferably is no greater than ½ second. The nitrocellulose content can be as high as 60% or as low as 30%. Higher percentages of nitrocellulose generally give greater film haze and poorer coalescibility while the lower percentages result in lower hot-drag temperatures and greater tendencies toward film blocking. A nitrocellulose content between 40 and 50 weight percent gives an optimum balance of the above properties.

The useful plasticizers are those having boiling points above 250° C., which will dissolve nitrocellulose at a 1 to 1 ratio at 100° C. For purposes of this invention, whether a plasticizer is liquid or solid is determined by its physical state at about 35° C. The plasticizer content influences the slip properties, hot-drag temperature, blocking characteristics, and haze of the coated film. Excess plasticizer tends to unfavorably influence the first three of these properties while a plasticizer deficient coating tends to increase film haze.

Among others, the following compounds illustrate useful solid plasticizers: dicyclohexyl phthalate, tricyclohexyl citrate, 2-butoxyethyl pelargonate, N-ethyl-p-toluene sulfonamide, N-cyclohexyl p-toluenesulfonamide, glyceryl tribenzoate, ethyl o-benzoyl benzoate, diisobutyl tartrate, N-cyclohexyl benzenesulfonamide, diphenyl phthalate, and dihydrobiethyl phthalate. Similarly, some useful liquid plasticizers are represented by dibutyl phthalate, dimethyl phthalate, diisobutylcarbinyl phthalate, dioctyl phthalate, tricresyl phosphate, diphenyl 2-ethylhexyl phosphate, butyl phthalyl butyl glycolate, ethyl phthalyl ethyl glycolate, diethyleneglycol monolaurate, 2-methoxyethyl acetyl ricinoleate, tributyl aconitate, cresyl phenyl phosphate, acetyl tributyl citrate, triethylene glycol pelargonate, dibutyl sebacate, dioctyl sebacate and tributyl tricarballylate.

At least 10 weight percent of a coalescing agent is necessary in the coating in order to insure a clear film. Coalescing agents are liquids which exert a solvent action on the nitrocellulose. They have boiling points between 120 and 230° C., usually between 130 and 230° C., and relative rates of evaporation of between 0.01 and 0.5, usually 0.01 and 0.3. Generally an increase in coalescing agent content above 18%, and certainly above 30%, lowers the hot-drag temperature of the coated film and tends to produce haze.

Examples of useful coalescing agents include methyl "Cellosolve," butyl "Carbitol," methyl amyl acetate (2,4-dimethylbutyl acetate), methyl amyl ketone, diisobutyl ketone, isophorone, diacetone alcohol, "Cellosolve" acetate, ethyl lactate, and methyl "Carbitol." Glycol esters and ethers are particularly preferred.

In addition to a particular weight percent of an individual ingredient, the weight ratio of the sum of plasticizer (both solid and liquid) and coalescing agent to nitrocellulose is important. A ratio below about 0.33 tends to give a hazy film while a ratio above 2.2 renders a blocky film with a low hot-drag temperature. A ratio of 0.43-1.27 is preferred.

Emulsifiers useful in the aqueous nitrocellulose compositions of this invention are anionic emulsifiers either alone or mixed with up to about an equal quantity or more of non-ionic emulsifiers. Emulsifiers of these classes are described in "Detergents and Emulsifiers—Up to Date," 1963, John W. McCutcheon, Inc.

Examples of emulsifiers include alkaryl sodium sulfonates such as "Nacconol" NRSF, "Sulframin" L, "Sulframin" NAB, "Santomerse" SX, "Santomerse" E, "Santomerse" 85 (dodecylbenzene sodium sulfonate), "Ultrawet" 30DS, 68KN, 60L, 35KK, Sk, "Oronite" S; alkyl sulfates such as "Duponol [1]" C (sodium lauryl sulfate), sodium oleyl sulfate, sodium stearyl sulfate,

[1] Registered trademark of E. I. du Pont de Nemours & Co.

"Teepol," "Duponol [1]" ME, "Alcoterge," sodium cetyl sulfate, "Conco" Sulfate WA (sodium lauryl sulfate), "Dehydag" Wax E, "Nopco" 1477; alkyl aryl polyether sulfates such as "Triton" 770, X-301 and 202; amide sulfonates such as "Stepanol" AM, "Stepanol" ME; sulfated alkylol amides such as sulfated cocomonoethanol amide (Bull. soc. chim. France 1952, 476–80); phosphate esters such as "Gafac" RE (polyoxyethylene nonyl phenol particularly esterified with phosphoric acid), "Tergitol" P-28 (sodium di(2-ethylhexyl) phosphate), "Victamuls" 20, 24C, 27, 89; esters of polyphosphoric acids such as $$Na_5R_5(P_3O_{10})_2$$

where R is a $C_8$ radical such as capryl or 2-ethylhexyl ("Victawets" 35B and 58B) ester and ether-linked sulfonates such as "Igepon" AC-78 (coconut oil acid ester of sodium isethionate), dialkyl sodium sulfosuccinates ("Aerosol" OT-di-2-ethylhexyl sodium sulfosuccinate).

Examples of non-ionic emulsifiers which can be used in conjunction with the anionic detergents in proportions up to 50% or more by weight of the total emulsifier include polyethenoxy ethers of alkyl phenols such as "Igepals" RC-760, DM-710, DM-730 and RC-520 (alkylphenoxypoly(ethylenoxy)ethanols) and "Tritons" N-128, N-101 and N-100 (nonylphenyl polyethoxy ethanols); polyethenoxy ethers of fatty alcohols such as "Tergitols" 3A3, 3A6 and 3A9 (polyoxyethylated tridecyl alcohol); polyethenoxy esters such as "Teox" 120 (polyethenoxy tallate); polyethenoxy mercaptans such as "Penetrant" 100; polyethenoxy glycols such as the "Tweens" (polyoxyethylene sorbitan monolaurate, monopalmitate, monostearate, monooleate and trioleate); glycol esters such as the "Spans" (sorbitan monolaurate, monopalmitate, monostearate, trisoleate); organic phosphate esters such as the "Victamuls"; and amine-acid condensates such as lauric acid-isopropanol amine condensate or stearic acid-diethanolamine condensate. Other useful non-ionic surfactants include those obtainable from condensation of ethylene oxide with alkyl and alkanolamides, with aliphatic alcohols particularly those with at least an eight carbon chain, with alkyl thiols, with phenols and with aliphatic and aromatic carboxylic acids.

To enhance the films blocking resistance and elevate its hot-drag temperature, at least 20 weight percent of a film forming hard resin modifier is present. While as high as 50% of this ingredient can be tolerated, 40 weight percent is preferably not exceeded in order to avoid adverse effects on film gloss and haze. Useful film forming hard resin modifiers include sucrose benzoate, rosin acids, rosin-modified phenolics, phenolic resins, rosin modified pentaerythritol ester gum, toluenesulfonamide-formaldehyde resins, ureaformaldehyde resins and coumarone-indene resins.

In addition to the above enumerated ingredients, two others are necessary in order to provide a coated film which possesses the good non-blocking and slip characteristics demanded of a film for high speed machine packaging operations. A natural occurring wax such as carnauba, montan, ouricury, and sugar cane wax having a melting point above 75° C., and preferably below 100° C., is one of such ingredients. The other is a particulate slip agent having a particle size between 0.1 and 10 microns. Examples of slip agents include mica, vinyl chloride polymers such as "Geon 126" and Opalon, clays such as bentonite, or talcs such as steatite. The recited amounts of both the wax and slip agent are limited to that which does not increase film haze or reduce gloss.

As stated earlier, the wax and particulate slip agent are added to the other ingredients of the aqueous emulsion after the high speed mixing operation. The addition is generally made with the wax and slip agent already in an aqueous emulsion using a non-ionic emulsifier.

The solids content of the aqueous dispersions of this invention are generally from 25–60 weight percent and preferably 35–45 percent.

While the aqueous dispersions of the present invention can be applied to a variety of films, its most desired use is in combination with a film that is dimensionally stable with respect to moisture (i.e., no detectable change in dimension when subjected to a relative humidity change of from 20% to 90% at 25° C.), and heat (i.e., less than a 1% change in either the lengthwise or transverse direction when heated at 100° C. for one minute). A biaxially oriented polypropylene film made according to the process described in U.S. Pat. 3,141,912, heat set according to the process described in U.S. Pat. 3,257,490 and flame treated for adherability according to British patent specification 1,010,649 is especially preferred. However, other methods of film manufacture, thermal stabilization, and surface adherability treatment can be used.

The following examples illustrate the present invention. All parts and percentages are by weight unless otherwise indicated.

EXAMPLE 1

In accordance with the general procedure illustrated in Belgian Pat. 660,374, 74 parts of isopropyl acetate, 58 parts of dibutyl phthalate, 29 parts of dicyclohexyl phthalate, 75 parts of methyl "Cellosolve" and 163 parts of sucrose benzoate are charged into a water jacketed pot from a Type "L" Laboratory Kady Mill having a peripheral velocity in the range of 7,000 to 25,000 ft./min. To the agitating solution in the Kady Mill 331 parts of 70% water wet nitrocellulose having a nitrogen content of 11.8% and a viscosity of ½ second (ASTM–D–301–56; 25% concentration) are added. Upon dissolution of the nitrocellulose (about 5 minutes) a solution of 23 parts of "Gafac" RE610 in 848 parts of deionized water is introduced and the entire mixture is further agitated at 18,000 r.p.m. for 20 minutes. The resultant milky-white opaque oil-in-water emulsion is concentrated to approximately 45% solids content by heating the mixture at 65–70° C. for 4 hours, during which time the isopropylacetate is substantially removed with the residual solvent content being less than 1%. (Alternately, the organic solvent can be removed by distilling the mixture in a Rinco Thin-Film evaporator, a typical distillation being carried out at 45° C. and under a vacuum of 26–28 inches of mercury.) The solid particle size in this dispersion ranges from 0.2 micron to 0.8 micron.

To this dispersion there is added, based on the non-aqueous ingredients of the dispersion, 0.5% "Geon 126" slip agent and 5% of carnauba wax dispersed as a 10% emulsion with 2.3%/5.2%—"Span 60/Tween 60" emulsifier. The dispersion is then diluted with water to a 35% solids content and coated on one side of a biaxially oriented polypropylene film. The film is prepared according to Example 2 of U.S. Pat. 3,141,912; heat-set following the procedure of U.S. Pat. 3,257,490 by subjecting the film to a temperature of 140° C. for 10 seconds while allowing a retraction in the TD direction of 25% and in the MD direction of 7%; and treated for enhanced adherability according to British Pat. 1,010,649 with a fuel equivalence ratio of 1.0, an oxygen ratio of 0.278, film speed 350 feet per minute, drum temperature 55° C., with a burner lip opening of 100 mils and distance of the film from the opening of the burner in passing through the flame of 3.0 mm. Excess dispersion is doctored from the film and the film is dried by passage through a coating tower held at about 75° C. The coated film has about 6 grams of coating per square meter of film.

The film prepared in Example 1 exhibits no detectable change in dimension when subjected to a change in relative humidity from 20% to 90% at 25° C. and less than a 1% dimensional change when subjected to a temperature of 100° C. for one minute. The coated film has a transparency of 85% (measured according to ASTM–1746–60T with at least 65% transparency being required) and a moisture permeability value of 25 (measured according to ASTM–96E–Method E with a value of less than 30 being required). In addition, the coated film exhibits the following properties: odor rating of 1; solvent seal and heat seal of 123 g./in. and 10–15 g./in., respectively; coefficient of friction of 0.23 (measured as described by D. K. Owens, Journal of Applied Polymer Science 8 1465 (1964) with film to film and film to metal coefficients of less than 0.30 being required); haze value of 0.77% (measured according to ASTM–D1003–59T with less than 2% being required); gloss (MD) (coating machine direction) of 112 (measured according to ASTM–D523–537 with at least a value of 100 being required); a blocking grade of 1; and a hot-drag temperature of 75° C.

The methods for carrying out the tests, where not above designated, are as follows:

Blocking: 15 to 20 sheets of 4 in. x 4 in. film are piled in a stack front to back. The stack is placed between two 4 in. x 4 in. sheets of chipboard and wrapped to form a package in waxed kraft paper. The package is placed on a smooth sheet of metal at least 1/16 in. thick and approximately 6 in. square. A 4 in. x 4 in. lead weight with a smooth face and having a weight of 25 lbs. (1.5 lb./sq. in.) is accurately placed on the package of sheets, and the entire assembly is placed in an oven maintained at 65° C. for 16 hours. The package of sheets is removed from the the oven and allowed to cool to room temperature (one hour or more). The cooled package of sheets is carefully unwrapped, the chipboard removed, and the stack of sheets grasped by thumb and forefinger in the center of the stack. A shearing force is then applied with care taken to avoid bending the stack or disturbing its edges. The stack is graded as follows:

Grade 1—the sheets slide apart individually with no tendency whatever to cling together.

Grade 2—the stack separates into 2 or more groups of sheets which remain moderately firmly matted together.

Grade 3—the stack cannot be separated by straight shearing force and can be separated only by peeling the sheets apart.

Films with Grade 1 blocking are preferred. Films with Grade 2 can be used, however, films with Grade 3 blocking are unsatisfactory.

Hot-drag temperature: This temperature is defined as the temperature at which the frictional drag shown by the film reaches a value which is double that shown by the film at a reference temperature of 30° C. The test is carried out by drawing a test strip of the film at a constant speed over a felt covered platform with a heated brass plate, the temperature of which is steadily increasing, resting upon the film. The brass plate, weighing 1.4 pounds and having an area of 1⅜ sq. inches in contact with the moving film, is connected to a 4 inch long pointer mounted on a shaft with low friction bearings and furnished with a 56 gram counter weight fixed at a point 3¼ inches below the bearing shaft. The brass plate is heated at a rate such that its temperature rises 6° C.–9° C. per minute as measured by a thermocouple. The steady scale reading of the pointer is recorded as the film is drawn through the machine with the brass plate at 30° C. and then the temperature of the plate is raised gradually until the scale reading of the pointer reaches the value of twice that shown at 30° C. At this time the temperature of the plate, as indicated by the thermocouple, is recorded as the hot-drag temperature. The hot-drag temperature should be at least 65° C.

Odor: 0.1 Squaremeter pieces of coated film are placed in individual one quart Mason jars. The jars openings are covered with sheets of 50 gauge "Mylar[2]" polyester film and the jars are sealed by screwing the caps tightly over the "Mylar[2]" film coverings. The jars are stored for 18

---
[2] Registered trademark of E. I. du Pont de Nemours & Co.

hours at about 25° C. after which the jars are opened and the odor ratings are determined by a panel of at least three experienced odor testers. Each tester checks at least two sample bottles. The odor ratings are as follows:

Rating 1—no detectable odor
Rating 2—slight odor, but not objectionable
Rating 3—moderate odor, not especially objectionable
Rating 4—strong odor, definitely objectionable A film with a rating of 1 or 2 is acceptable, one with a rating of 3 may be acceptable for some purposes but not for the wrapping of especially odor sensitive products such as tobacco. Film having a rating of 4 is definitely unacceptable.

Solvent and heat seal: A portion of the coated surface area at one end of each of two 1 inch wide sections of coated film are brushed lightly with methyl "Cellosolve" solvent. The coated surfaces of the sections are placed in contact and the area brushed with the solvent is placed in a conventional jaw sealer at 125° C., 5 p.s.i. for ½ second. After aging for about 13 days, the two sections at the unsealed end are placed in a Suter or Instron testing device and the force required to pull the sealed sections apart is determined. The heat seal test is similar except that the solvent application is omitted. The solvent seal should be at least 50 g./in. while less than 25 g./in. and preferably 10 g./in., heat seal strength should be shown.

A film coated with the emulsion of Example 1, except for the addition of a natural occurring wax and particulate slip agent, gives a blocking grade of 3 and is, thus, unsatisfactory.

EXAMPLES 2–8

In accordance with the procedure illustrated by Example 1, coated films are prepared with the ingredients and proportions as listed below. The solids content, nitrocellulose nitrogen content and viscosity, and the wax and slip agent additions are as in Example 1. The percentages are by weight.

| Example | Nitrocellulose | Sucrose benzoate | Dibutyl phthalate | Dicyclohexyl phthalate | "Gafac" RE610 | Methyl "Carbitol" |
|---|---|---|---|---|---|---|
| 2 | 39 | 35.2 | 10.5 | | 4.8 | 10.5 |
| 3 | 48.6 | 25.8 | 10.5 | | 4.6 | 10.5 |
| 4 | 39 | 25.8 | 10.5 | 9.6 | 4.6 | 10.5 |
| 5 | 44 | 25 | 10.7 | 4.9 | 4.9 | 10.5 |
| 6 | 39.2 | 25.7 | 20 | | 4.6 | 10.5 |
| 7 | 43.8 | 30.5 | 10.5 | | 4.7 | 10.5 |
| 8 | 39.2 | 25.6 | 10.5 | | 4.7 | 20 |

The coated films prepared according to these examples have substantially the same transparency, moisture permeability and stability, and heat stability as the film in Example 1. In addition, the coated films show the following results for some of the tests described above:

| Example | Heat seal, g./in. | Solvent seal, g./in. | Hot drag, °C. | Coeff. of friction F/F[1] | Coeff. of friction F/M[2] | Odor rating | Haze | Gloss (MD) | Blocking grade |
|---|---|---|---|---|---|---|---|---|---|
| 2 | 4 | 216 | 75 | .15 | .15 | 1.5 | 1.5 | 124 | 1 |
| 3 | 0 | 210 | 85 | .18 | .17 | 1.0 | 1.3 | 126 | 2 |
| 4 | 22 | 210 | 70 | .27 | .16 | 1.5 | 1.4 | 133 | 2 |
| 5 | 0 | 108 | 72 | .20 | .22 | 1.2 | 1.7 | 110 | 1 |
| 6 | 0 | 140 | 73 | .40 | .22 | 1.5 | 1.0 | 110 | 3 |
| 7 | 0 | 180 | 78 | .23 | .17 | 1.0 | 1.3 | 126 | 2 |
| 8 | 0 | 148 | 65 | .30 | .15 | 2.0 | 2.2 | 108 | 3 |

[1] Film to film.
[2] Film to metal.

EXAMPLE 9

A coated polypropylene film having 6.8 grams of coating per square meter is prepared as in Example 1 except that the following ingredients are used. The solids content, nitrocellulose nitrogen content and viscosity, and the wax and slip agent ingredients are as in Example 1.

| Ingredient: | Percent (based on non-aqueous ingredients) |
|---|---|
| Nitrocellulose | 32.4 |
| Diphenyl 2-ethylhexyl phosphate | 17.5 |
| Methyl "Carbitol" | 10.5 |
| "Gafac" RE610 | 4.4 |
| "Beckacite" 1118 (rosin-maleic anhydride-glyceral condensation product) | 35.2 |

The film of this example has a solvent seal of 125 grams/inch, coefficients of friction of 0.15, a haze value of 0.9, a gloss (MD) of 124, and a blocking grade of 1. The other properties are comparable with those of the film of Example 1.

What is claimed is:

1. An aqueous dispersion having a solids content of about from 25–60%, the non-aqueous ingredients of which consist essentially of, by weight,
   (a) 30–60% nitrocellulose having a nitrogen content of 10.8–12.2%, a viscosity of ⅛–6 seconds, and a number average particle diameter of .05–1.0 micron with 90% of the particles less than 0.8 micron,
   (b) plasticizer having a boiling point above 250° C. which will dissolve nitrocellulose at a 1:1 ratio at 100° C., the plasticizer comprising, by weight of the aqueous dispersion,
       (i) 0–10% plasticizer which is solid at about 35° C., and
       (ii) 5–25% plasticizer which is liquid at about 35° C.,
   (c) 10–30% coalescing agent having a boiling point of 120° C.–230° C. and a relative evaporation rate of about 0.01–0.5, and which exerts a solvent action on nitrocellulose,
   (d) 0.1–20% emulsifier comprising anionic emulsifier and up to about 100%, based on the weight of anionic emulsifier, of nonionic emulsifier,
   (e) 20–50% film forming hard resin modifier selected from sucrose benzoate, rosin acids, rosin-modified phenolics, phenolic resins, rosin modified pentaerythritol ester gum, toleuenesulfonamide-formaldehyde resins, unreaformaldehyde resins and coumaroneindene resins.
   (f) 2–7.5%, based on 100 weight percent of (a)–(e), naturally ocurring wax having a melting point above 75° C., and
   (g) 0.1–1.0%, based on 100 weight percent of (a)–(g), particulate slip agent having a particle size between 0.1 and 10 microns, the weight ratio of (b)+(c) to (a) being 0.33–2.2, and ingredient (b)(i) being present in an amount less than 50% of (b), the quantities of (f)+(g) being adjusted so as not to increase film haze or reduce gloss, the sum of the weight percentages of the non-aqueous ingredients being 100.

2. The dispersion of claim 1 wherein the nitrocellulose (a) is present in an amount of 40–50%.

3. The dispersion of claim 1 with 0–5% solid plasticizer (b)(i) and 10–18% liquid plasticizer (b)(ii).

4. The dispersion of claim 1 wherein the coalescing agent (c) is present in an amount of 10–18%.

5. The dispersion of claim 2 with 0–5% solid plasticizer (b)(i), 10–18% liquid plasticizer (b)(ii), and 10–18% coalescing agent (c) with the weight ratio of (b)(i)+(b)(ii)+(c) to (a) being 0.43–1.27.

6. The dispersion of claim 5 wherein the nitrocellulose (a) has a nitrogen content of 11.8–12.2%, a viscosity of ¼–½ second, and 90% of the nitrocellulose particles have a diameter of less than 0.6 micron and the coalescing agent (c) has a boiling point of 130° C.–230° C. and a relative evaporation rate of 0.01–0.13.

7. The dispersion of claim 6 having 1.5–10% emulsifier, 25–40 film forming hard resin modifier, and 3–6%, based on 100 weight percent of ingredients (a)–(g), of natural occurring wax having a melting point above 75° C.

References Cited

UNITED STATES PATENTS

| 2,245,499 | 6/1941 | Reichel et al. | 106—170 |
| 2,563,708 | 8/1951 | Crane | 106—170 |
| 2,843,583 | 7/1958 | Voris | 106—170 |

ALLAN LIEBERMAN, Primary Examiner

U.S. Cl. X.R.

106—173, 191, 195; 260—14, 15, 17